Nov. 24, 1936.   A. W. STROUD   2,061,782
CONVEYER
Filed Dec. 17, 1935   2 Sheets-Sheet 1

Inventor
Archibald William Stroud,
by John B. Brady
Attorney

Nov. 24, 1936.  A. W. STROUD  2,061,782
CONVEYER
Filed Dec. 17, 1935    2 Sheets-Sheet 2

Inventor
Archibald William Stroud,
by John O. Brady
Attorney

Patented Nov. 24, 1936

2,061,782

UNITED STATES PATENT OFFICE 2,061,782

CONVEYER

Archibald William Stroud, Milngavie, Scotland

Application December 17, 1935, Serial No. 54,888
In Great Britain June 29, 1934

3 Claims. (Cl. 198—34)

This invention relates to conveyers of the type adapted to receive articles of confectionery, such as biscuits, which are deposited flat upon the advancing surface of the conveyer and are conveyed thereby for some form of treatment; for example, in the case of biscuits, the treatment may be coating them with chocolate.

An object of the invention is to provide an improved apparatus for feeding biscuits or other thin and flat articles of confectionery to a conveyer and depositing them thereon with substantial closeness together so that they can occupy (in so far as their shape permits them) all or nearly all the available space on the conveyer in order that the greatest practicable output thereof can be attained; the said apparatus involving a minimum of labour, obviating handling of the articles themselves, and therefore reducing the risk of breakage of the articles if such are at all fragile. Thus, the said apparatus is economical, efficient and hygienic, this last quality being important as regards articles of confectionery.

Another object of the invention is to make provision whereby the articles can be supplied to a feed conveyer as an already stacked assembly by stacking them thereon edgewise in laterally abutting longitudinally extending rows.

Another object is to provide a feed conveyer adapted to convey the stacked articles to a main conveyer working at higher speed than the feed conveyer whereby they are deposited flat on the main conveyer in close formation.

Another object of the invention is to provide an arrangement such that an assembly of articles will extend completely across the available width of each conveyer, so that said width will be charged with articles at a single hand operation performed almost instantaneously and that without any necessity of the worker handling the assembled articles.

Another object of the invention is to provide a feed conveyer with an article receiving surface which is flat and may be horizontal, or substantially so.

Yet another object of the invention is to provide the feed conveyer with a pair of longitudinal guide bars spaced apart approximately to the extent of the width to be occupied by the articles. Such guides are useful as an aid to accurate positioning of successive receptacles on the feed conveyer, and they are necessary as a support for the articles when these are of such a shape that they would topple or tend to topple laterally in the absence of suitable support.

One arrangement of apparatus according to the invention, as applied to a so-called enrober for coating biscuits with chocolate, will now be described by way of example with reference to the accompanying drawings, in which:—

Figure 1:
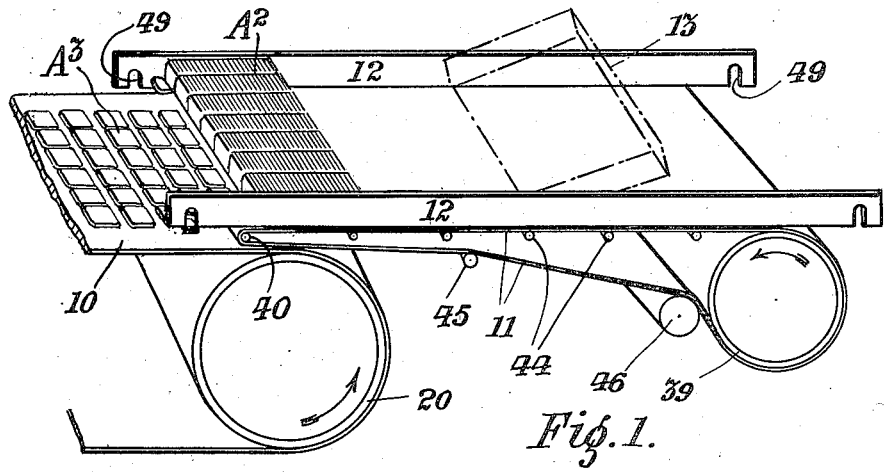
Fig. 1 is a diagrammatic perspective view showing the most prominent features of the apparatus.
Figure 2:
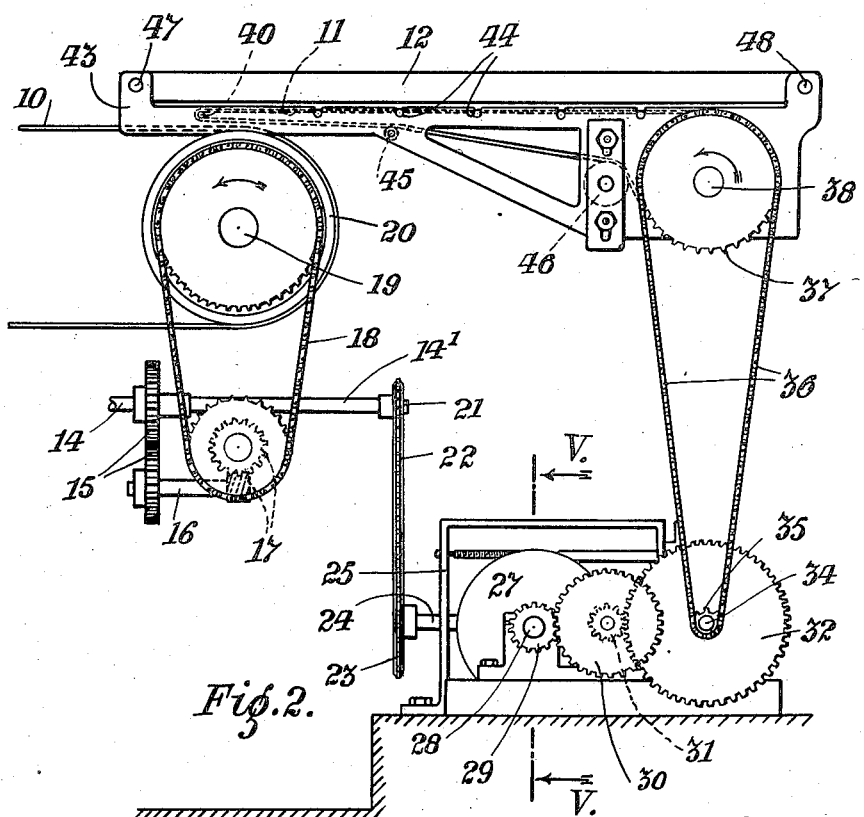
Fig. 2 is an elevation of the apparatus.

In the drawings, the main conveyer is denoted by 10, the feed conveyer by 11, longitudinal guide bars by 12 and a biscuit receptacle by 13.

The main conveyer consists of a canvas band and is driven from the main shaft 14 of the enrober, through the intermediary of inter-meshing spur gears 15, a counter-shaft 16, worm-gearing 17 and a chain-drive 18 which rotates at slow speed a shaft 19 carrying the driving-drum 20 of the main conveyer 10.

The parts 14 to 20 provided in connection with the main conveyer 10 are known in themselves and accordingly need not be described herein in further detail.

The feed conveyer 11 also consists of a canvas band and is driven in precise timed relationship with the main conveyer, although at much lower speed, each of the conveyers being driven along an endless path having a stationary location. The drive to the feed conveyer is taken from a shaft 14' provided as an extension of the main shaft 14. The shaft 14' has a sprocket wheel 21 connected by a chain 22 to a sprocket wheel 23 on a shaft 24 journalled in a bracket 25 on the floor. The shaft 24 is provided with a friction wheel 26—for example, made of or lined with fibre—the wheel 26 being in constant frictional engagement with a friction disc 27 secured to a shaft 28 to which is secured a pinion 29 driving a train of gears 30, 31 and 32. The gears 30, 31 of this train are secured to an idler shaft 33, and the gear 32 is secured to a shaft 34 to which is also secured a sprocket wheel 35. The wheel 35 is connected by a driving chain 36 to a sprocket wheel 37 on a shaft 38 carrying the driving drum 39 of the feed conveyer 11.

In the interests of clearness, the bearings supporting the shafts of the conveyer drums and the shafts included in the driving mechanism of the main conveyer have been omitted from the drawings.

Figure 3:
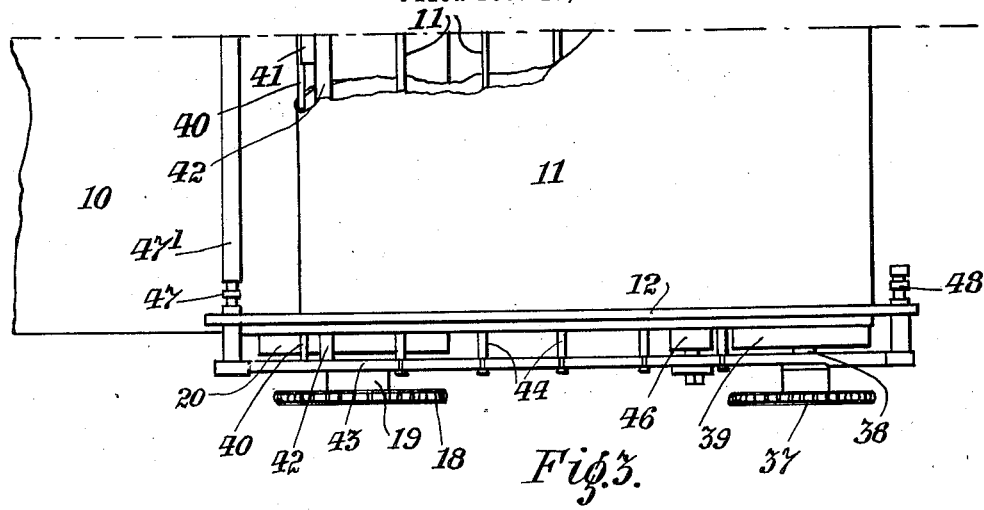
Fig. 3 is a half plan.

The top stretch of the feed conveyer, like that of the main conveyer, presents a flat horizontal advancing biscuit receiving surface. The upper and lower stretches of the feed conveyer converge closely together as they approach its biscuit delivery end, where they closely overlie the biscuit receiving end of the main conveyer 10. At the biscuit delivery end of the feed conveyer, the band 11 composing it passes round a small diameter roller 40 which is partially supported in a stationary location by a number of small bearing blocks 41 (one of which is shown in Fig. 3). Thus, the feed conveyer has a delivery end which is in effect short and steeply inclined. The blocks 41 are provided on a cross-bar 42 secured to side frame members 43 supporting parts associated with the feed conveyer. The upper stretch of the feed conveyer passes over a series of transverse supporting rollers 44, and its lower stretch passes over a supporting roller 45 and a jockey pulley 46, which latter is vertically adjustable for the purpose of regulating the tension of the conveyer band.

The guide bars 12 are each supported at opposite ends by horizontal supports 47, 48, the supports 48 being short members and the supports 47 being interconnected by an extension 47', which serves as a guard at the place where the biscuits are transferred from the one conveyer to the other. Each guide bar is provided at opposite ends with recesses 49 which fit into notches constituted by annular recesses in the respective supports 47, 48. By virtue of these notches, the guide bars are adjustable to and from one another, so that the width defined by them can be varied at will. To adjust a guide, it is simply necessary to raise it clear of the notches engaged for the time being, displace it sidewise the desired amount, and replace it in engagement with other notches.

As it is important that the feed conveyer should be driven in precise speed relationship with the main conveyer, the reduction gearing through which the feed conveyer is driven includes fine adjustment speed transmission varying gear, the gear shown being applied to the friction drive constituted by the wheels 26, 27. As shown (see particularly Fig. 4) an adjustment shaft 50 with a manually turnable handle 51 is journalled in the bracket 25, the shaft 50 having a screw threaded portion engaged by a nut 51. This nut forms part of a fork 52 which engages between collars 53 forming part of the same unit as the friction wheel 26. The arrangement is such that, by turning the wheel 51, the wheel 26 is adjusted radially of the wheel 27, so that the transmission ratio is proportionately varied.

Figures 4, 5:
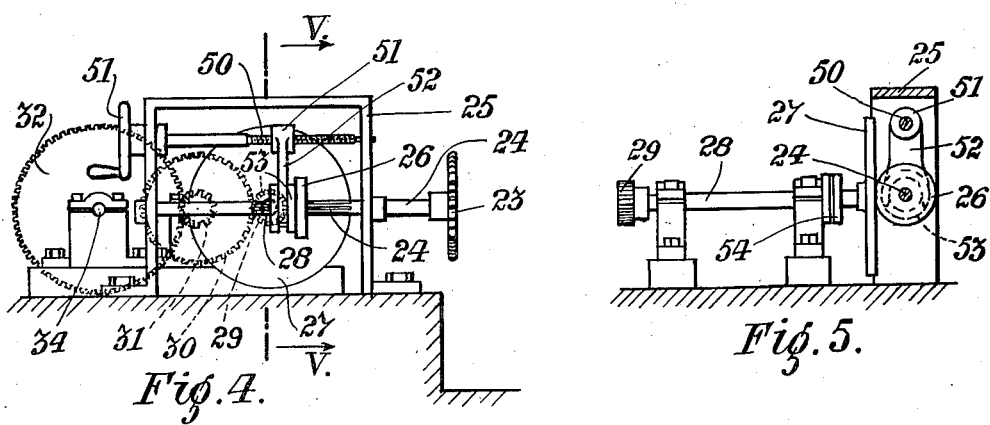
Fig. 4 is an elevation of a variable friction disc drive and associated parts viewed in the opposite direction to Fig. 2.
Fig. 5 is a section on the lines V—V of Figs. 2 and 4.

The wheels 26, 27 are pressed into driving contact, the thrust of this pressure being taken by a ball thrust bearing 54 provided on the shaft 28 (see Fig. 5).

Figure 6:
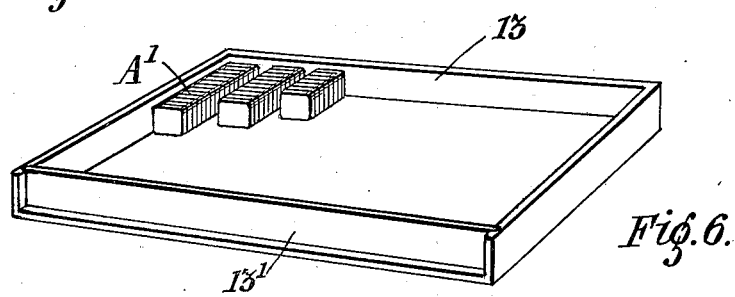
Fig. 6 is a perspective view of one form of receptacle for the biscuits to be supplied to the apparatus.

The biscuit receptacle shown in Fig. 6 consists of a tray 13 having a front wall 13' which has a feather and groove sliding connection with the side walls and is therefore removable. Biscuits are packed on edge in longitudinal rows as indicated by A' in Fig. 6, in which groups of biscuits belonging to three rows only are shown. Each tray thus packed with biscuits is placed by the operator on the feed conveyer with its front wall in contact with the last supplied biscuits; thereafter the front wall is removed, the tray is canted by raising its rear, and it is given a slight but consistent vibratory movement, during which it is gradually slid back from below the biscuits leaving them on edge upon the feed conveyer and abutting against the biscuits previously supplied thereto. The thin flat biscuits are of course individually unstable when put on edge—that is, they would at once fall flat—but here they serve to support one another longitudinally of the feed conveyer while assembled thereon. In Fig. 1 the feed conveyer is shown supplied with longitudinal rows of biscuits $A^2$ resting on edge and approaching the biscuit delivery end, the most advanced biscuits being shown toppling from said end upon the main conveyer to join other biscuits $A^3$ already supplied thereto. It will be manifest that each biscuit falls flat on the main conveyer at the instant when it reaches the short and steeply inclined article delivery end of the feed conveyer.

The speed relationship between the two conveyers is approximately the same as the relationship between the successive horizontal dimensions of the biscuits (i. e. first their thickness, when they are positioned as at $A^2$, and then their width, when positioned as at $A^3$). Thus, when the biscuits are deposited upon the main conveyer they are arranged closely together, not only laterally, but also longitudinally of the conveyer.

The main conveyer conveys the biscuits to means for coating them with chocolate, but this treatment forms no part of the present invention and accordingly need not be described.

It is to be understood that the apparatus described and illustrated has been given by way of example and that modifications within the scope of the following claims can be made. Other forms of receptacles might be employed. For example, in another form of tray, the bottom instead of the front wall is quickly detachable, being secured to the side wall by clips. Such clips may be dispensed with entirely, and in that event the bottom can be kept in position by finger pressure alone as the trays are placed in position on the feed conveyer. In yet another form of tray, the removable bottom has a feather and groove or other sliding connection with the side walls. With such an arrangement, the packed tray is placed upon the feed conveyer after which the removable bottom is withdrawn rearwards, the front, rear and side walls of the tray remaining as an open frame positively maintaining the biscuits in their packed formation on the feed conveyer. In such an arrangement it is preferable to omit the guard 47' and provide a series of transverse rollers or bars above the main conveyer at the level of the delivery end of the feed conveyer, the arrangement being such that each successive tray, as the biscuits transfer themselves to the main conveyer, continues its movement upon the said rollers until finally removed by the operator therefrom. However, the provision of supporting rollers could be omitted, as the operator would have ample time to remove the frame clear of the feed conveyer after the bottom of the tray had been removed.

In the claims I have used the expression "flat belt feed-conveyer", by which I mean a continuous width of the belt which is not made up of strands.

While I have described my invention in one of its preferred embodiments, I desire that it be understood that modifications may be made and that no limitations upon my invention are intended other than may be imposed by the scope of the appended claims.

I claim:—

1. In combination with a travelling main conveyer for articles of confectionery; consisting of a flat belt feed conveyer having a stationary location and adapted to receive thin and flat articles of confectionery closely packed together on edge in an assembly consisting of laterally abutting longitudinally extending rows, such articles being individually unstable while on edge and thus mutually interdependent for support longitudinally of the feed conveyer, said flat belt feed conveyer having a short and steeply inclined article delivering end placed entirely above the main conveyer so that each of the articles falls flat on the main conveyer at the instant when the article reaches the incline of said article delivering end, and means driving the feed conveyer to travel in its stationary location at a speed so much lower than that of the main conveyer that the articles arrange themselves in close formation upon the main conveyer.

2. The combination claimed in claim 1, in which the short and steeply inclined article delivering end of the feed conveyer is obtained by leading the conveyer in a flat substantially horizontal plane to and around a small diameter member arranged in a stationary location immediately above the level of the main conveyer.

3. In combination with the elements defined in claim 1, longitudinal article guides associated with the article receiving surface of the feed conveyer, said guides being spaced apart to an extent substantially the same as the effective width of said surface.

ARCHIBALD WILLIAM STROUD.